United States Patent [19]
Ishibashi et al.

[11] Patent Number: 5,362,936
[45] Date of Patent: Nov. 8, 1994

[54] WIRE ELECTRIC DISCHARGE MACHINE HAVING ALTERABLE DISCHARGE PERIOD

[75] Inventors: Yuji Ishibashi; Akihiro Komori, both of Nagoya, Japan

[73] Assignee: Brother Kogyo Kabushiki Kaisha, Nagoya, Japan

[21] Appl. No.: 45,322

[22] Filed: Apr. 12, 1993

[30] Foreign Application Priority Data

Apr. 30, 1992 [JP] Japan .................. 4-111459

[51] Int. Cl.⁵ .......................... B23H 7/04; B23H 7/20
[52] U.S. Cl. ................................................. 219/69.12
[58] Field of Search ............... 219/69.12, 69.13, 69.18, 219/69.17

[56] References Cited

U.S. PATENT DOCUMENTS

| | | | |
|---|---|---|---|
| 4,366,359 | 12/1982 | Yatomi et al. | 219/69.12 |
| 4,392,041 | 7/1983 | Yatomi et al. | 219/69.12 |
| 4,695,696 | 9/1987 | Ozaki et al. | 219/69.12 |
| 5,122,630 | 6/1992 | Reynier et al. | 219/69.12 |
| 5,243,166 | 9/1993 | Nakayama | 219/69.12 |
| 5,276,301 | 1/1994 | Kohsaka et al. | 219/69.12 |

FOREIGN PATENT DOCUMENTS

| | | | |
|---|---|---|---|
| 53-66092 | 6/1978 | Japan | 219/69.12 |
| 58-51020 | 3/1983 | Japan | 219/69.12 |
| 62-208829 | 9/1987 | Japan | . |
| 1-64723 | 3/1989 | Japan | . |
| 1-216725 | 8/1989 | Japan | . |
| 1-264718 | 10/1989 | Japan | 219/69.12 |
| 2-298433 | 12/1990 | Japan | . |
| 4-63630 | 2/1992 | Japan | 219/69.12 |

*Primary Examiner*—Geoffrey S. Evans
*Attorney, Agent, or Firm*—Oliff & Berridge

[57] ABSTRACT

A discharge frequency per unit time between a wire electrode and a workpiece is detected, and the thickness of the workpiece is estimated on the basis of the discharge frequency, the relative moving speed between the wire electrode and the workpiece and the information on the shape of the workpiece. Thereafter, the optimum discharge period is calculated on the basis of the estimated thickness of the workpiece and the set processing conditions to perform the processing of the workpiece.

15 Claims, 4 Drawing Sheets

Fig.3

→TARGET INTER-ELECTRODE VOLTAGE [V]

↓ DISCHARGE PERIOD [μSEC]

| | 30 | 40 | 50 | 60 | ... |
|---|---|---|---|---|---|
| 6 | 3992 | 3198 | 2487 | 1781 | ... |
| 8 | 3805 | 3093 | 2398 | 1706 | ... |
| 10 | 3381 | 2787 | 2175 | 1559 | ... |
| 12 | 2881 | 2405 | 1899 | 1372 | ... |
| 15 | 2355 | 1978 | 1571 | 1145 | ... |
| ... | ... | ... | ... | ... | ... |

Fig.4

| WORKPIECE | Fe | Cu | Al | ... |
|---|---|---|---|---|
| COEFFICIENT KT | 25.8 | 22.1 | 12.9 | ... |

Fig.5

| | 10 | 20 | ... | 100 |
|---|---|---|---|---|
| Fe | 29.8 | 23.5 | ... | 11.8 |
| Cu | 31.6 | 25.3 | ... | 12.2 |
| ... | ... | ... | ... | ... |

→ THICKNESS WT OF WORKPIECE [mm]

WIRE ELECTRIC DISCHARGE MACHINE HAVING ALTERABLE DISCHARGE PERIOD

BACKGROUND OF THE INVENTION

1. Field of the Invention

This invention relates to a wire electric discharge machine for processing a workpiece (an object to be processed) by repetitively inducing pulse-shaped discharge across a wire electrode and the workpiece.

2. Description of Related Art

In this type of wire electric discharge machine, it is known that when the interval of the discharge pulses to be applied across a wire electrode and a workpiece, that is, a discharge period, is set to an excessively small value, the discharge is concentrically induced and breakage of the wire electrode is liable to occur. On the other hand, when the discharge period is set to an excessively large value, the processing speed is reduced.

It is also known, in this type of wire electric discharge machine, that as the thickness of the workpiece is increased, the confronting area between the workpiece and the wire electrode is increased. Conversely, as the thickness of the workpiece is decreased, the confronting area between the workpiece and the wire electrode is decreased. Therefore, the concentrated discharge, which causes the breaking of the wire electrode, occurs less often as the thickness of the workpiece is increased.

Accordingly, the conventional wire electric discharge machine has been so designed that the user sets the most suitable discharge period in accordance with the material and the thickness of the workpiece before processing the workpiece, and the processing of the workpiece is carried out using the set discharge period.

There are some cases where a workpiece has a varied thickness, such as a workpiece having a stepped portion that must be processed using the wire electric discharge machine. In order to carry out the processing of such a workpiece with an optimum discharge period at all times, the discharge period must be altered at a timing based on the thickness of the workpiece.

However, the wire electric discharge machine is frequently driven using an unmanned operation system because the processing time for the workpiece is long and thus it is difficult to alter the discharge period at the time the variation in thickness of the workpiece occurs.

Therefore, in a case where a workpiece having stepped portions is processed using the conventional wire electric discharge machine, in order to prevent breakage of the wire electrode, the discharge period must be set to a discharge period which is suitable for the thickness of the thinnest portion of the workpiece. Therefore, there occurs a problem that the processing speed at thick portions of the workpiece is reduced to a value lower than the optimum processing speed resulting in a longer processing time.

SUMMARY OF THE INVENTION

An object of the invention is to provide a wire electric discharge machine in which a workpiece having stepped portions, one whose thickness is altered, can be processed in the shortest processing time.

A second object of the invention is to provide a wire electric discharge machine in which the movement speed for the workpiece is constant but the inter-electrode voltage is changed to account for variations in the thickness of the workpiece.

Inherent in both objects is the object of providing an optimal inter-electrode discharge period for the cutting conditions.

In order to attain the above objects, the wire electric discharge machine according to the invention comprises processing condition setting means for setting information concerning a workpiece and the processing conditions, discharge control means for applying a pulse-shaped voltage across a wire electrode and a workpiece on the basis of a discharge period set by the processing condition setting means, inter-electrode voltage detection means for detecting an average voltage across the wire electrode and the workpiece, relative movement means for relatively moving the wire electrode and the workpiece, and moving speed control means for controlling the relative moving speed between the wire electrode and the workpiece so that the average inter-electrode voltage detected by the inter-electrode voltage detection means is equal to a target inter-electrode voltage set by the processing condition setting means, or so that the relative moving speed is equal to a feeding speed set by the processing condition setting means, in which the workpiece is processed by repetitively inducing a pulse-shaped discharge across the wire electrode and the workpiece, and is characterized by further including discharge-frequency detection means for detecting the frequency (number of times) of discharge per unit time across the wire electrode and the workpiece, thickness estimating means for estimating the thickness of the workpiece on the basis of the discharge frequency detected by the discharge-frequency detection means, the relative moving speed between the wire electrode and the workpiece which is controlled by the moving speed control means, and information on the workpiece which is set by the processing condition setting means, discharge period calculating means for calculating an optimum discharge period on the basis of the thickness of the workpiece estimated by the thickness estimating means and the processing condition set by the processing condition setting means, and discharge period altering means for altering a discharge period, at which the pulse-shaped voltage is applied by the discharge control means, to the discharge period calculated by the discharge period calculating means.

The discharge-frequency detection means may be so designed as to estimate the discharge frequency per unit time on the basis of the target inter-electrode voltage set by the processing condition setting means when the moving speed control means controls the relative moving speed so that the average inter-electrode voltage is equal to the target inter-electrode voltage, or the average inter-electrode voltage detected by the inter-electrode voltage detection means when the moving speed control means controls the relative moving speed to be equal to the feeding speed set by the processing condition setting means and the discharge period set by the processing condition setting means.

In the wire electric discharge machine according to the invention thus structured, the discharge control means applies the pulse-shaped voltage across the wire electrode and the workpiece on the basis of the discharge period set by the processing condition setting means, and the inter-electrode voltage detection means detects the average voltage across the wire electrode and the workpiece. In addition, the relative movement means moves the wire electrode and the workpiece relatively, and the moving speed control means controls the relative moving speed so that the average inter-electrode voltage detected by the inter-electrode voltage detection means is equal to the target inter-electrode voltage set by the processing condition setting means or so that the relative moving speed is equal to the feeding speed set by the processing condition setting means.

When the processing of the workpiece is started by actuation of these means, the discharge-frequency detection means detects the frequency (number of times) of discharge per unit time between the wire electrode and the workpiece and the thickness estimating means estimates the thickness of the workpiece on the basis of the detected discharge frequency, the relative moving speed between the wire electrode and the workpiece, which is controlled by the moving speed control means, and the information on the workpiece which is set by the processing condition setting means. Subsequently, the discharge period calculating means calculates the optimum discharge period for the workpiece on the basis of the estimated thickness of the workpiece and the processing condition set by the processing condition setting means, and the discharge period altering means alters the discharge period for the application of the pulse-shaped voltage by the discharge control means to the discharge period calculated by the discharge period calculating means.

The reason the discharge-frequency detection means detects the discharge frequency required to estimate the thickness of the workpiece is that even if a pulse-shaped voltage is applied between the wire electrode and the workpiece by the discharge control means, there would occur some cases where the discharge is not actually induced. Therefore, the reciprocal of the discharge period is not simply equal to the discharge frequency.

BRIEF DESCRIPTION OF THE DRAWINGS

The invention will be described with reference to the drawings in which:

FIG. 3 is a table showing a map for the estimation of a discharge pulse number NP;

FIG. 4 is a table showing a map for the setting of a coefficient in accordance with a workpiece material; and FIG. 5 is a table showing a map for the calculation of an optimum discharge period.

DETAILED DESCRIPTION OF PREFERRED EMBODIMENT

Figure 1:
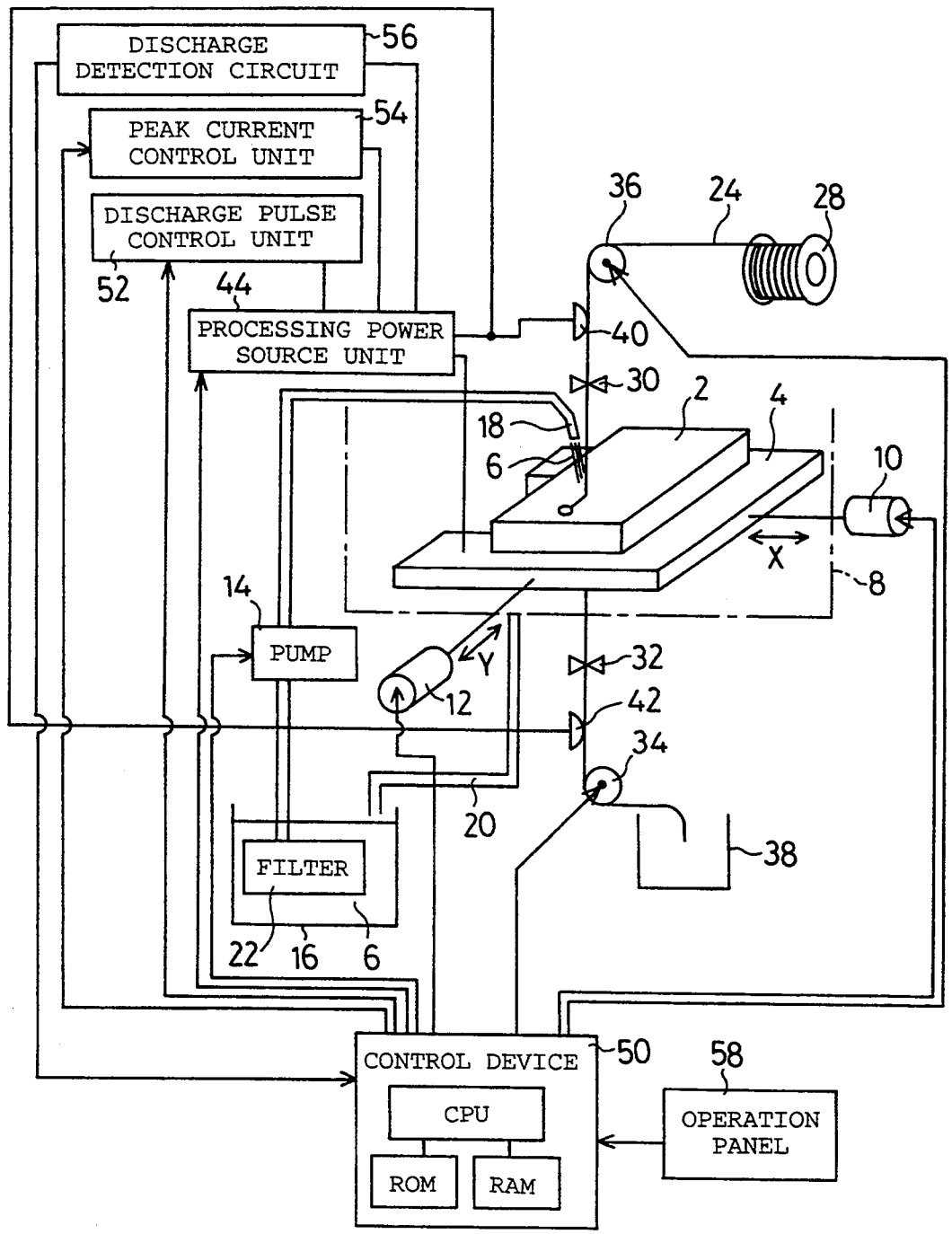
FIG. 1 is a schematic diagram showing the structure of an embodiment of a wire electric discharge machine according to the invention.

FIG. 1 is a schematic diagram showing the structure of a wire electric discharge machine to which this invention is applied.

As shown in FIG. 1, the wire electric discharge machine of this embodiment is equipped with a movable table 4 to which a workpiece 2 to be processed is fixed. The movable table 4 is disposed inside of a processing tank 8, storing processing liquid 6 therein, and is moved in the X-axial direction and the Y-axial direction by an X-axis servo motor 10 and a Y-axis servo motor 12, respectively.

The processing liquid 6 is pumped from a processing liquid tank 16 by a pump 14, supplied through a processing liquid supply unit 18 to a processing portion of the workpiece 2, and then stored in the processing tank 8. The used processing liquid 6, which overflows from the processing tank 8, is returned through a discharge pipe 20 to the processing liquid tank 16, passed through a filter 22 for filtration to be again pumped by the pump 14.

A wire electrode 24 for processing the workpiece 2 is drawn from a wire bobbin 28 and supported by an upper wire guide 30 and a lower wire guide 32, which are disposed at the upper and lower sides of the workpiece 2. The wire electrode 24 is moved, maintaining its tension, by a wire driving motor 34 and a tension roller 36 and the used wire electrode 24 is discharged to a waste-wire discharge portion 38. In addition, upper and lower voltage supply units 40 and 42, for applying a pulse-shaped voltage for discharge (hereinafter referred to as "pulse voltage") to the wire electrode 24, are disposed in a moving passageway located above the upper wire guide 30 and in a moving passageway located below the lower wire guide 32. The voltage supply units 40 and 42 are connected to a processing power source unit 44. A pulse voltage is applied across each of the voltage supply units 40 and 42 and the movable table 4 from the processing power source unit 44 to induce discharge between the wire electrode 24 and the workpiece 2, whereby the workpiece 2 is processed.

Connected to the processing power source unit 44 are a discharge pulse control unit 52 and a peak current control unit 54 for respectively controlling the generation interval (discharge period) and the peak current of a pulse signal which is generated to allow the generation of discharge in accordance with a control signal from a control device 50. Further, a discharge detection circuit 56, serving as inter-electrode voltage detection means for detecting the discharge and the average inter-electrode voltage (hereinafter referred to as "inter-electrode voltage") between the wire electrode 24 and the workpiece 2, is connected to the processing power source unit 44.

The control device 50 comprises a well-known microcomputer primarily including a CPU, a ROM, and a RAM. The control device 50 serves to output control signals, based upon data input from an operation panel 58 serving as the processing condition setting means, to the X-axis servo motor 10, the Y-axis servo motor 12, the pump 14, the wire driving motor 34, the tension roller 36, the processing power source unit 44, the discharge pulse control unit 52, and the peak current control unit 54 on the basis of the various processing conditions (such as the material of the workpiece 2, the shape of the workpiece 2, the discharge period, the target inter-electrode voltage, and the inter-electrode voltage detected by the discharge detection circuit 56) to control the driving of the above elements.

The control device 50 carries out the following control operations:

(1) a moving speed control operation as the moving speed control means in which the rotational speeds of the X-axis servo motor 10 and the Y-axis servo motor 12 are so controlled that the actual inter-electrode voltage detected by the discharge detection circuit 56 is equal to the target inter-electrode voltage which is input through the operation panel 58 to control the moving speed of the movable table 4 and thus the workpiece 2;

(2) a processing shape control operation for controlling the driving of the X-axis servo motor 10 and the Y-axis servo motor 12 in accordance with information on the processing shape of the workpiece 2 which is input through the operation panel 58;

(3) a processing-liquid circulation controlling operation for circulating the processing liquid 6 by driving the pump 14;

(4) a wire electrode moving control operation for moving the wire electrode by driving the wire driving motor 34 and the tension roller 36; and (5) a discharge period control operation for the wire electrode for outputting a control signal to the discharge pulse control unit 52 on the basis of the material of the workpiece 2, the discharge period, and the target inter-electrode voltage, which are input through the operation panel 58, to thereby control the discharge period at which the discharge pulse is generated by the processing power source 44.

Of the various control operations which are executed in the control device 50 as described above, the discharge period control operation, which is a main processing of this invention, will be hereunder described.

At the time when the processing of the workpiece is started, a discharge period input through the operation panel 58 is set as an initial value, and a control signal corresponding to the set value is output to the discharge pulse control unit 52 to execute a discharge period initial setting process (not shown) for applying a discharge pulse across the wire electrode 24 and the workpiece 2. Thereafter, the discharge period renewing process, as shown in FIG. 2, is repeatably carried out at a predetermined time interval to renew the discharge period.

Figure 2:
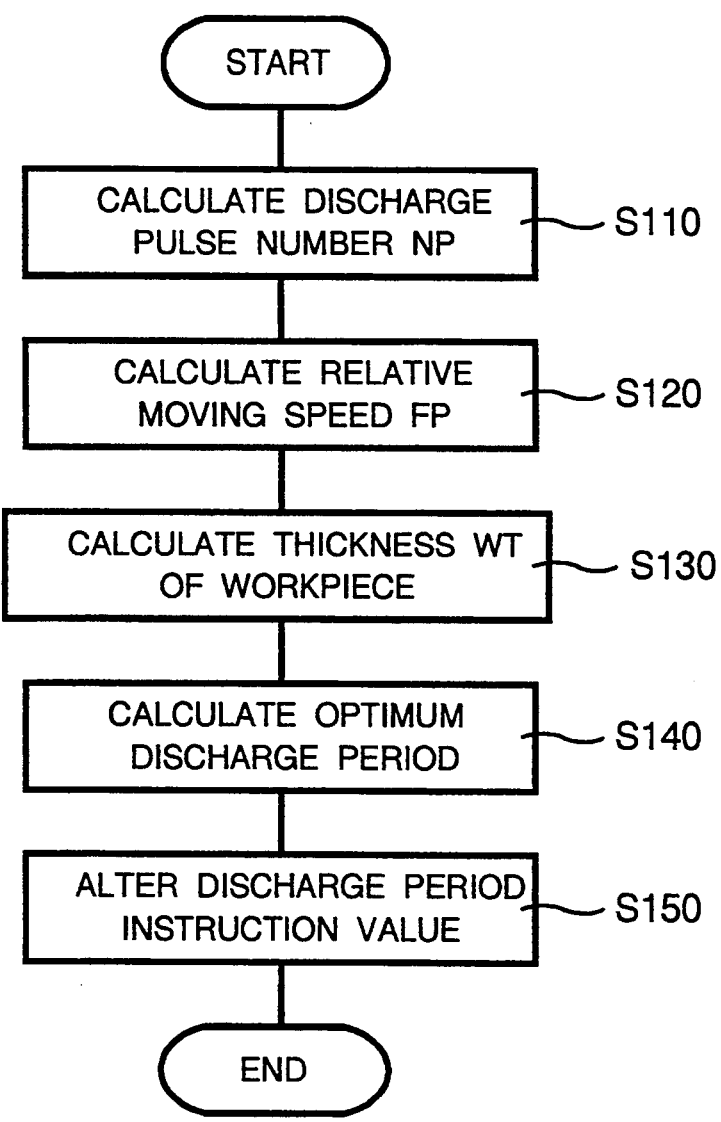
FIG. 2 is a flowchart for a discharge-frequency renewing process which is executed in a control device.

As shown in FIG. 2, in the discharge period renewing process, at a step S110, on the basis of the target inter-electrode voltage [V] and the current discharge period [μsec.], a discharge pulse number NP representing the frequency of discharge (number of times of discharge) per unit time (for example, every 50 msec.) which is actually induced between the wire electrode 24 and the workpiece 2 is estimated using a map, as shown in FIG. 3, which is stored in the ROM of the control device 50, that is, the process carried out at the step S110 is the discharge frequency detection means. The program goes to step S120 to calculate a relative moving speed FP between the workpiece and the wire electrode 24.

The calculation of the relative moving speed FP (S120) is the average speed per unit time of a moving speed of the workpiece 2 which is controlled by the moving speed control operation.

At the step S110, the discharge pulse number NP can be estimated on the basis of the target inter-electrode voltage and the current discharge period because the actual inter-electrode voltage is controlled to the target inter-electrode voltage through the moving speed control operation and the distance between the wire electrode 24 and the workpiece 2 is increased, as the target inter-electrode voltage is heightened, so that the rate of the non-discharge frequency to the application of the discharge pulse is increased. In view of the foregoing, the table as shown in FIG. 3 is experimentally set in advance.

At step S130, on the basis of information about the material (iron Fe, copper Cu, aluminum Al, or the like) of the workpiece 2 input through the operation panel 58, a coefficient KT corresponding to the material of the workpiece 2 is determined using the map as shown in FIG. 4 which is stored in a ROM of the control device 50, and the thickness WT [mm] of the workpiece 2 is estimated using a calculation expression [WT=KT×NP/FP] on the basis of the coefficient KT, the number of discharge pulses NP per unit time, which is calculated at step S110, and the relative moving speed FP between the workpiece 2 and the wire electrode 24 which is calculated at step S120, that is, the process of a thickness estimating means is carried out at step S130.

The relative moving speed FP is inversely proportional to the thickness of the workpiece 2 (that is, it is reduced more as the thickness of the workpiece 2 is increased) and it is proportional to the discharge pulse number NP (that is, it is higher as the discharge pulse number is heightened) and varied in accordance with the material of the workpiece 2. Therefore, in this embodiment, the thickness of the workpiece 2 is estimated on the basis of the above calculation expression which is transformed from a calculation expression [FP=KT×NP/WT] representing the above relationship.

Upon completion of the calculation of the thickness WT of the workpiece 2 as described above, the program goes to step S140 to calculate the optimum discharge period (discharge period most suitable) for the material and the thickness WT of the workpiece 2, that is, to carry out the process of a discharge period calculating means.

Finally, at step S150, the instruction value of the discharge period for the discharge control unit 52 is altered to the optimum discharge period calculated at step S140, that is, the process of a discharge period altering means is carried out at step S150, and then the discharge period renewing process is ended.

As described above, in this embodiment, the thickness WT of the workpiece 2 is estimated on the basis of the discharge pulse number NP, the relative moving speed FP between the workpiece 2 and the wire electrode 24 and the coefficient KT corresponding to the material of the workpiece 2. The optimum discharge period is then calculated on the basis of the estimated thickness WT and the material of the workpiece 2, thereby altering the discharge period.

Therefore, according to the wire electric discharge machine of this embodiment, the discharge period can be controlled to the optimum value in accordance with the material and thickness of the workpiece 2 so that, unlike the conventional device, it is unnecessary to renew the discharge period at the variable timing of the variation in thickness of the workpiece 2. Therefore, even when the workpiece 2 has stepped portions whose thickness is varied, the workpiece 2 can be processed under an unmanned operation system in the shortest processing time.

Further, in this embodiment, the discharge pulse number NP is estimated, using a pre-established map on the basis of the target inter-electrode voltage [V] and the current discharge period [μsec.], so that a special sensor for detecting the discharge pulse number NP does not need to be provided and the structure of the device is simplified.

The invention is not limited to the above embodiment, and various modifications may be made without departing from the subject matter of the invention.

For example, in the above embodiment, the thickness of the workpiece 2 is calculated using the calculation expression. In place of the above manner, the following manner may be used. That is, a map for calculating the thickness is pre-established and stored in the ROM of the control device 50 and the thickness of the workpiece 2 is estimated using the map.

Further, the above embodiment relates to the wire electric discharge machine in which the moving speed of the movable table 4 is so controlled that the inter-electrode voltage between the wire electrode 24 and the workpiece 2 is equal to the target inter-electrode voltage. However, the same effect can be obtained for a wire electric discharge machine in which the moving speed of the movable table 4 is controlled so as to be equal to a pre-established constant speed. In this case, in the discharge period renewing process, the inter-electrode voltage detected by the discharge detection circuit 56 may be used in place of the target discharge voltage at step S110 where the discharge pulse number NP is estimated.

As described above, according to the wire electric discharge machine of the invention, the thickness of the workpiece is estimated on the basis of the discharge frequency per unit time between the wire electrode and the workpiece, the relative moving speed between the wire electrode and the workpiece and the information on the workpiece, and the optimum discharge period for the workpiece is calculated on the basis of the estimated thickness of the workpiece and the processing conditions, whereby the discharge period is altered to the calculated optimum discharge period. Therefore, according to the wire electric discharge machine of this invention, the discharge period can be controlled in accordance with the thickness of the workpiece at all times and, unlike the conventional device, it is not required to renew the discharge period at the variable timing of changes in the thickness of the workpiece. Accordingly, even when the workpiece has stepped portions whose thickness is varied, the workpiece can be processed using an unmanned operation system in the shortest processing time.

What is claimed is:

1. A wire electric discharge machine in which a workpiece is processed by repetitively inducing a pulse-shaped discharge across a wire electrode and the workpiece, comprising:

processing condition setting means for setting information on a workpiece and processing conditions;

discharge control means for applying a pulse-shaped voltage across a wire electrode and a workpiece on the basis of a discharge period set by the processing condition setting means;

inter-electrode voltage detection means for detecting an average voltage across the wire electrode and the workpiece;

relative movement means for relatively moving the wire electrode and the workpiece;

moving speed control means for controlling the relative moving speed between the wire electrode and the workpiece so that a one of the average inter-electrode voltage detected by the inter-electrode voltage detection means is equal to a target inter-electrode voltage set by the processing condition setting means and the relative moving speed is equal to a feeding speed set by the processing condition setting means;

discharge-frequency detection means for detecting the number of times of discharge per unit time across the wire electrode and the workpiece;

thickness estimating means for estimating the thickness of the workpiece on the basis of the number of times of discharge per unit time detected by the discharge-frequency detection means, the relative moving speed between the wire electrode and the workpiece which is controlled by the moving speed control means and information on the workpiece which is set by the processing condition setting means;

discharge period generating means for generating an optimum discharge period on the basis of the thickness of the workpiece estimated by the thickness estimating means and the processing conditions set by the processing condition setting means; and discharge period altering means for altering a discharge period at which the pulse-shaped voltage is applied by the discharge control means to the discharge period generated by the discharge period generating means.

2. The wire electric discharge machine according to claim 1, wherein the discharge-frequency detection means includes estimating means for estimating the number of times of discharge per unit time on the basis of a one of the target inter-electrode voltage set by the processing condition setting means when the moving speed control means controls the relative moving speed so that the average inter-electrode voltage is equal to the target inter-electrode voltage and the average inter-electrode voltage detected by the inter-electrode voltage detection means when the moving speed control means controls the relative moving speed to be equal to the feeding speed set by the processing condition setting means, and the discharge period set by the processing condition setting means.

3. The wire electric discharge machine as claimed in claim 1, wherein the thickness estimating means further uses a coefficient based upon a material of the workpiece for estimating the thickness of the workpiece.

4. A method of processing a workpiece with a wire electric discharge machine, comprising the steps of:

setting an initial discharge period;

setting a one of a target inter-electrode voltage and a relative moving speed between the workpiece and a wire of the wire electric discharge machine;

controlling the relative moving speed between the workpiece and the wire of the wire electric discharge machine; and renewing the discharge period on a periodic cycle, wherein the step of renewing the discharge period comprises the steps of:

estimating the thickness of the workpiece;

generating an optimum discharge period for the material and the estimated thickness of the workpiece; and after the initial discharge period, using the generated optimum discharge period as a current discharge period.

5. The method as claimed in claim 4, wherein the step of estimating the thickness of the workpiece further comprises the steps of:

generating a frequency of discharge per unit time;

determining the relative moving speed; and selecting a coefficient based upon a material of the workpiece.

6. The method as claimed in claim 4, wherein generating said frequency of discharge is done based on a inter-electrode voltage and the current discharge period.

7. The method as claimed in claim 6, further comprising reiterating the generating a frequency of discharge through using the generated optimum discharge period steps for each unit time.

8. The method as claimed in claim 6, wherein said relative moving speed is controlled as set and the inter-electrode voltage is an average of detected inter-electrode voltages per unit time.

9. The method as claimed in claim 6, wherein the inter-electrode voltage is set and the relative moving speed is controlled to maintain the set inter-electrode voltage.

10. A wire electric discharge machine for processing a workpiece, comprising:
   means for setting an initial discharge period;
   means for setting a one of a target inter-electrode voltage and a relative moving speed between the workpiece and a wire of the wire electric discharge machine;
   means for controlling the relative moving speed between the workpiece and the wire of the wire electric discharge machine; and
   means for renewing the discharge period on a periodic cycle, wherein the means for renewing the discharge period comprises:
   means for estimating the thickness of the workpiece;
   means for generating the optimum discharge period for the material and the estimated thickness of the workpiece; and
   after the initial discharge period, means for using the generated optimum discharge period as a current discharge period.

11. The wire electric discharge machine as claimed in claim 10, wherein the means for generating the frequency of discharge uses an inter-electrode voltage and the current discharge period.

12. The wire electric discharge machine as claimed in claim 11, further comprising means for causing the means for generating a frequency of discharge, the means for determining, the means for selecting, the means for estimating, the means for generating the optimum discharge period and the means for using to reiterate their actions each unit time.

13. The wire electric discharge machine as claimed in claim 11, wherein said means for controlling controls the relative moving speed to be as set and further comprises a means for detecting inter-electrode voltages so that the inter-electrode voltage is an average of detected inter-electrode voltages per unit time.

14. The wire electric discharge machine as claimed in claim 11, wherein the inter-electrode voltage is as set and said means for controlling controls the relative moving speed to maintain the set inter-electrode voltage.

15. Wire electric discharge machine as claimed in claim 10, wherein the means for estimating the thickness of the workpiece further comprises:
   means for generating a frequency of discharge per unit time;
   means for determining the relative moving speed; and
   means for selecting a coefficient based upon a material of the workpiece.

* * * * *